(12) United States Patent
Roitburg

(10) Patent No.: US 8,090,635 B1
(45) Date of Patent: Jan. 3, 2012

(54) MORTGAGE PAYMENT INSURANCE METHOD AND SYSTEM

(76) Inventor: Igor Roitburg, Belle Mead, NJ (US)

( * ) Notice: Subject to any disclaimer, the term of this patent is extended or adjusted under 35 U.S.C. 154(b) by 643 days.

(21) Appl. No.: 12/151,565

(22) Filed: May 7, 2008

Related U.S. Application Data

(60) Provisional application No. 60/930,896, filed on May 19, 2007.

(51) Int. Cl.
*G06Q 40/00* (2006.01)
(52) U.S. Cl. ............................. 705/35; 705/36 R; 705/38
(58) Field of Classification Search ................. 705/4, 35
See application file for complete search history.

(56) References Cited

U.S. PATENT DOCUMENTS

| 2002/0103750 | A1* | 8/2002 | Herzfeld ......................... 705/38 |
| 2004/0019544 | A1* | 1/2004 | Yaruss et al. ..................... 705/35 |

OTHER PUBLICATIONS

Law Targets Mortgage Insurance / Rules make it easier to cancel coverage you no longer need Aug. 3, 1999|By Jane Bryant Quinn, Washington Post Writers Group.*
"Credit Insurance: Is It for You?", *FTC Consumer Alert* Federal Trade Commission, Bureau of Consumer Protection, Office of Consumer and Business Education, Nov. 2002, 2 pages.
"Payment protection insurance", http://en.wikipedia.org/w/index.php 2008, 1 page.
"Radian Guaranty Launches Program to Keep Borrowers in Homes", http:\\www.marketwatch.com/news/story/radian-guaranty-launches-program-keep/story.as.. 2008, 3 pages.

* cited by examiner

*Primary Examiner* — Lindsay M Maguire
*Assistant Examiner* — James Vezeris

(57) ABSTRACT

A mortgage loan is provided with mortgage payment insurance that provides payments to a lender upon borrower default. The mortgage loan is underwritten based on the mortgage payment insurance. The mortgage payment insurance policy providing that if a borrower defaults, without any further conditions, in its payment obligation under the mortgage, the insurer will make one or more insurance payments to borrower's payee, such payments to be made during the period the mortgage loan is in default.

23 Claims, 4 Drawing Sheets

MORTGAGE PAYMENT INSURANCE METHOD AND SYSTEM

PRIORITY AND CROSS-REFERENCE TO RELATED APPLICATIONS

This application claims the benefit of U.S. Provisional Application No. 60/930,896, filed May 19, 2007, herein incorporated by reference in its entirety. This application is related to U.S. application Ser. No. 12/151,564, entitled MORTGAGE PAYMENT INSURANCE METHOD AND SYSTEM, naming Igor Roitburg as the inventor, filed on the same day as this patent application, herein incorporated by reference in its entirety.

FIELD OF THE INVENTION

This invention relates to computer systems and methods used to provide mortgages and insurance related to mortgages.

BACKGROUND OF THE INVENTION

Most home buyers do not have sufficient assets to purchase a home outright on a cash basis. Therefore, lenders such as banks and credit unions offer mortgage loans to potential home buyers. A mortgage is a legal document that pledges a property to the lender as security for the payment of a debt. If the borrower fails to repay the debt, the lender has a legal claim against the home which allows the lender to sell the property and use the proceeds to pay off the loan balance (foreclosure). The mortgage loan therefore allows the home buyers to purchase a home and pay for the home over time, while also ensuring that the lender is repaid.

In addition to offering loans to potential home buyers, lenders also offer such loans to existing home buyers for the purpose of refinancing. Refinancing refers to the process of paying off one loan with the proceeds from a new loan using the same property as security for the repayment obligation. For the borrower, the purpose of the refinancing is usually to obtain a lower interest rate and/or to obtain cash for other purposes by reducing equity in the home. Herein, loan funds used for "financing" housing includes both loan funds used for purchasing housing and loan funds used for refinancing housing.

Mortgages carry default risk to the lender that depends on a wide range of borrower, property and transaction characteristics. Relevant borrower characteristics include the purpose of the loan, credit score, income, employment longevity and financial assets. Relevant property characteristics include type of structure, appraised value and location. Relevant loan transaction characteristics include the type of mortgage, term, ratio of loan to property value, and method used to document the financial status of the borrower.

Lenders protect themselves against default risk in three ways. First, they assess every loan against underwriting requirements, which are complex rules designed to determine whether a particular set of borrower, property and transaction characteristics can be approved. Underwriting is primarily a "yes" or "no" decision process, though sometimes it can be conditional. Increasingly, underwriting has become automated, with human underwriters entering the process in doubtful or borderline cases.

The second way in which lenders protect themselves against risk is to require borrowers to purchase mortgage insurance. The prevailing rule is that borrowers are required to purchase mortgage insurance if their down payment on a home purchase, or their equity in a refinance, is less than 20%. In the event of a foreclosure, the mortgage insurer will pay to the lender the difference (up to the agreed-upon coverage amount) between the unpaid loan balance plus foreclosure expenses, and the net proceeds from the foreclosure sale.

The third and by far the most important way in which lenders protect themselves against risk is to adjust the interest rate, referred to as "risk-based pricing" or a "risk premium." The adjustment takes the form of a rate increment above that charged on a "prime" transaction, which is one that carries the lowest risk. In a typical prime transaction: a) the borrower has a good credit history, including a FICO score of at least 720; b) the loan amount is 80% of property value or less; (c) the borrower has had stable employment for at least 2 years and fully documents income and assets; and (d) the property is a single-family home used as the borrower's primary residence.

As borrower, property and transactions characteristics diverge from those of a prime transaction, rate increments increase. The market uses a rough classification system in which loans fall into three categories: "mainstream", "Alt-A" and "sub-prime". Alt-A loans usually involve weak documentation while sub-prime loans involve low credit scores, though in both segments many other factors can be involved. In the mainstream segment, risk premiums can run up to 1.5-2%, in the Alt-A market they can get to 3%, and in the sub-prime market they can reach 5%.

In the mortgage insurance system, more than half of all insurance premium dollars are typically placed in a reserve account. In contrast, in the risk premium system, risk premiums that are not needed to cover current losses are realized as income by investors. As a result, they are not available to meet future losses. This makes the risk premium system vulnerable to a major episode of default, which episodes tend to occur about every 12-15 years.

Such an episode occurred in 2007-8, with devastating consequences on a world-wide basis. If even one-quarter of all of the risk premiums charged borrowers during the previous 10 years had been maintained in reserve accounts, all of the losses should have been amply covered. But reserves were not maintained and the losses severely depleted the capital of major financial institutions. Mortgage insurers, in contrast, while hard hit, had more sufficient reserves to cover their losses.

Portfolio lenders, who hold the mortgages they originate, do carry loan loss reserves, but the tax laws discourage significant contributions to these accounts. In any case, most loans are sold in the secondary market and end up as the collateral underlying mortgage-backed securities. Each individual security carries reserves, but there is no carryover from one security to another.

Every mortgage security carries "credit enhancement", which are special protections for investors. One common form of credit enhancement, called "excess spread", channels part of the risk premiums into a special reserve account which is available for meeting losses. However, at some point the funds in the account that are not needed to meet losses are paid out to investors who have purchased the right to them.

A cardinal principle of securitization is that each security must stand on its own bottom. For legal and operational reasons, reserves cannot be shifted between securities. Thus, even though the losses on securities issued during 2000-2004 were generally small, none of the funds in those reserve accounts have been available to meet losses on securities issued in 2006-2007, which were high.

The paradoxical result is that mortgage risk premiums are both too small and too large. They are too small to meet the losses from a bulge in defaults over a short period. But if risk premiums were properly reserved, the reserve accounts would be far larger than needed to meet even a major default shock. It would be advantageous to provide systems and methods which may enable lower costs to borrowers and minimize losses.

SUMMARY OF THE INVENTION

In accordance with one embodiment, a computer-implemented method of originating a mortgage loan is provided. The method includes the step of receiving information from a first computer related to a mortgage loan application from a borrower, wherein the information includes information related to a mortgage payment insurance policy, the mortgage payment insurance policy providing that if a borrower defaults in its payment obligation under the mortgage, the insurer will make one or more insurance payments to borrower's payee, the default requiring no further conditions, the insurer at risk for the insurance payments should a loss result, such insurance payments to be made during the period that the mortgage loan is in default. An underwriting determination is generated for the mortgage loan based on the borrower having the mortgage payment insurance policy. It includes an evaluation of any terms or conditions of the loan imposed by the mortgage payment insurance policy. The loan is originated based on the existence of a mortgage payment insurance policy and subject to any terms or conditions thereof.

In accordance with another embodiment, a system for providing mortgage loans to a borrower is provided. The system includes a user interface for receiving borrower information, a loan origination system, and an underwriting engine. The underwriting engine provides an underwriting decision based on a mortgage payment insurance policy, which provides that if a borrower defaults in its payment obligation under the mortgage, the insurer will make one or more insurance payments to borrower's payee, the default requiring no further conditions, the insurer at risk for the insurance payments should a loss result, such insurance payments to be made during the period that the mortgage loan is in default.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Figure 1:
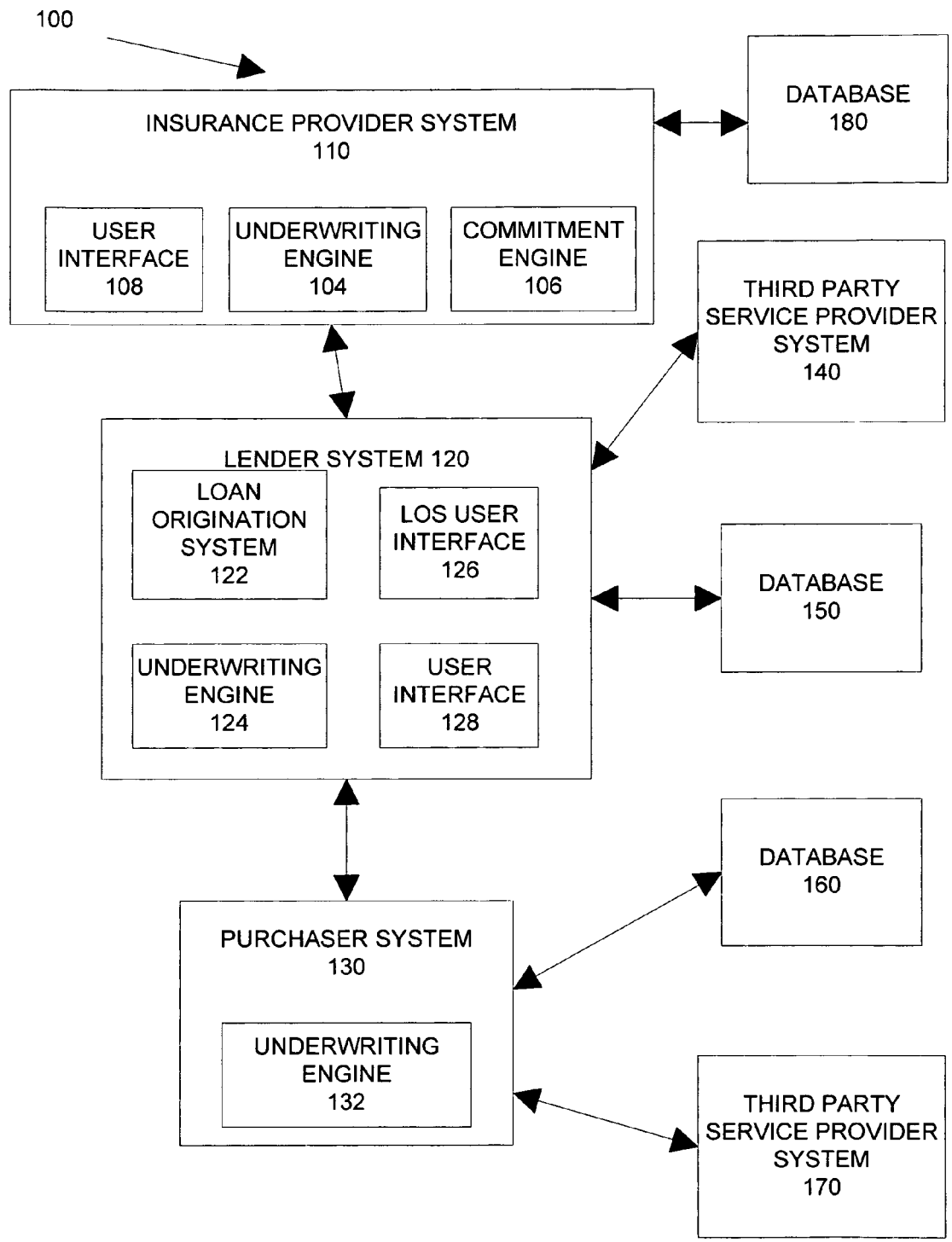
FIG. 1 is a block diagram of a system for providing mortgage payment insurance in accordance with one preferred embodiment.

In accordance with one embodiment, a computer-implemented method and system is provided for financing mortgage loans by which all mortgage risk is managed through mortgage insurance—i.e., loan rates would not reflect an interest rate risk premium. This mortgage insurance is called herein "mortgage payment insurance" (MPI).

The system and method according to an embodiment of the present invention provides mortgage payment insurance guaranteeing to the lender (1) that a borrower's scheduled mortgage payments will be made to the lender in the event that a borrower defaults in its obligation, and (2) in the event of a foreclosure, the insurer will pay to the lender the difference (up to the agreed-upon coverage amount) between the unpaid loan balance plus foreclosure expenses, and the net proceeds from the foreclosure sale. As used herein, insurer includes private and government entities. The insurer's obligation to make the scheduled mortgage payments on behalf of the borrower would begin after the borrower defaulted and any servicer obligation to make scheduled payments expired, and continue through and until the foreclosure, at which time the insurer would pay any deficiency (up to the agreed-upon coverage amount) between the foreclosure proceeds and the unpaid balance of the loan plus foreclosure expenses. Limits could be placed on the number of payments that the mortgage insurer would be required to make to ensure that all parties diligently proceed toward foreclosure. In the event that a borrower is able to make a cure payment prior to foreclosure, the mortgage insurer would receive the proceeds of such cure payment as reimbursement for the funds advanced by the insurer. In exchange for the protection offered by the insurance, the lender would extend loan rates and terms to the borrower that were reflective of such insurance coverage and the resultant reduction of risk of non-payment and/or loss from a default by the borrower. These rates could include the prime rate, the prime rate plus an allowable spread that could be determined by the insurer, a rate better than prime, or other rates. The embodiments described herein relate to providing MPI in connection with mortgage loans, and particularly non-prime mortgage loans, but it is recognized that other embodiments of the present invention could relate to borrowers of prime mortgage loans which may allow the lender to offer even better rates to borrowers that would have otherwise qualified for prime rates without MPI. Yet other embodiments of the invention can be used in the context of other types of loans, such as commercial loans, auto loans, and unsecured loans.

By protecting against (1) cash flow risk—e.g., the risk that a borrower default will interrupt cash flows, and (2) collateral risk—e.g., the risk that lender fails to recover the balance plus foreclosure costs, MPI transfers mortgage risk from the lender to the insurer. As a result, the need for interest rate risk premiums will be eliminated. Interestingly, once lender risk premiums are eliminated, the cost of mortgage insurance for the same amount of coverage could be reduced. This is so because lower interest rates mean fewer defaults and lower interest charges due at foreclosure when defaults do occur. It also means that any deficiency payment due at foreclosure will be lower because borrowers could build equity faster. Moreover, any insurance payments made by the insurer will be recovered dollar for dollar at the foreclosure—principal payments advanced will be recovered in the increased borrower equity and interest payments advanced will be recovered by the reduced bill for accumulated interest. In this embodiment, the only added costs in providing MPI over mortgage insurance as it exists today is the lost interest that could have been earned on the insurance payments as well as the added costs to administer the payments. These costs, however, will usually be a fraction of the savings that result from the elimination of the interest rate risk premium. As a result, mortgage insurers will be able to insure against all default risk for little (if any) more cost than they insure collateral risk alone. This will reduce borrower borrowing costs as well as lender and insurer losses when defaults do occur.

By eliminating interest rate risk premiums and transferring risk to the mortgage insurer, the borrower will pay less for a loan and the insurer and lender will experience lower losses when a default does occur. The lower total costs to borrowers will also reduce the incidence of foreclosures because loans will be more affordable. Moreover, by providing cash flow stability and reserves for when losses do occur, the vulnerability of the system to systemic crises, such as the one in 2007-8, would be substantially reduced.

The terms of the MPI and the mortgage loan can provide coverage to the lender should the borrower fail to make the premium payments on the MPI. In one embodiment, failing to make an MPI premium payment constitutes a default of the mortgage loan. In another embodiment, the premium for the MPI is such that coverage is provided through foreclosure even though an MPI payment is missed. In another embodiment, the MPI payment is escrowed. In yet another embodiment, the MPI premium payment is included in the note rate of the mortgage loan. In yet another embodiment, the premium due an insurer for providing MPI can be collected as part of the mortgage payment due a servicer. In other embodiments, the MPI premium payment is paid by the lender, the servicer, or a secondary market participant.

In one embodiment of MPI, the insurer's obligation to pay is triggered by default without another condition, such as unemployment, death, divorce, damage to the home, or other event. Thus, it does not matter the reason why a borrower misses a payment, MPI provides coverage upon default. Similarly, the borrower, lender, or servicer is not required to prove to the insurer the existence of any event other than perhaps default by the borrower.

In one embodiment, MPI provides that all scheduled loan payments from the first default to foreclosure are guaranteed to be made by the insurer to the lender on the borrower's behalf, should the borrower fail to make any payments. Payments to the lender could also include payments to another payee of the borrower, including an originator, servicer, or any other party designated by the payee. In another embodiment, a servicer or other entity may have some obligations to make payments on behalf of the borrower after the borrower's default. MPI could provide the payments after the payment obligations cease or the MPI payments could be in addition to such other payments. In another embodiment, the insurance payments can cover all payments to be made by borrower including principal, interest, taxes and insurance. In another embodiment, the payments can cover any portion of the total payments to be made under the mortgage. The insurer would be at risk for loss should any loss result after foreclosure.

In another embodiment, should the borrower cure the default, the insurer would be reimbursed for the payments it made under the MPI policy. In yet another embodiment the insurer can recover payments made under the MPI policy after foreclosure from a property sale or other disposition of the property.

The MPI policy could terminate based on one or more of the following events: foreclosure of the mortgage loan, termination of the mortgage loan, deed in lieu of foreclosure, or any disposition of the property by the borrower.

MPI can be used in connection with what is commonly known as mortgage insurance (or MI), wherein the MPI protects the mortgage lender against cash flow risk and the MI protects the mortgage lender against any collateral risk. In other embodiments, the features of MPI can be combined in one insurance policy, whereby the lender (or other interested party) is insured against loss from both cash flow risk and collateral risk. MPI as described herein can include either cash flow risk coverage or a combination of cash flow risk and collateral risk coverage.

In another embodiment, an existing mortgage insurance policy providing only collateral risk coverage can be amended to provide that in addition to the mortgage insurer agreeing to pay the difference (up to the agreed upon coverage amount) between the unpaid loan balance plus foreclosure expenses, and the net proceeds from the foreclosure sale, the insurer will also insure against cash flow risk and guarantee that the scheduled mortgage payments will be made to borrower's payee in the event the borrower defaults in such obligation, such obligation to continue until foreclosure or other disposition of the property. This amendment could occur with or without a new insurance underwriting and with or without any additional insurance premium. The insurance amendment could condition such additional coverage on the existing loan being amended or replaced with an amended or new loan on amended or new terms, including any amended or new loan terms and/or rate. In another embodiment, the original mortgage insurance policy could be terminated and replaced with a new MPI policy, such new MPI policy to include coverage for both cash flow risk and collateral risk and could include any conditions that the existing loan would have to meet, including any changes to the loan terms and/or rate. Said existing loan could be amended to meet any such conditions or terminated and replaced with a new loan meeting any such conditions to bind the coverage.

For example, an insurer could agree that it will convert every MI policy into an MPI policy if the loan rate is reduced to the prime rate and such reduction in rate results in at least a 10% monthly reduction in the borrower's scheduled payments. The reduction in borrower payments should increase the potential that the loan does not default or if it has already defaulted, it increases the chances that the loan is saved. In one embodiment, MPI coverage can be provided for a loan in default in connection with loss mitigation efforts, such as forbearance, a repayment plan, loan modification, refinance, or a reinstatement/account made current.

In another embodiment where the existing loans have no MI, the investor could take a write down equal to the value of the loan for what is necessary to get to a 95% LTV, for example, instead of going to foreclosure. A new lender could make the loan with MPI and refinance the original loan, and then existing lender could have a negative equity certificate or something similar against the borrower such that the should the borrower sell and get an equity gain, then the original lender would receive a benefit from that sale to offset the loss on the original loan.

In another embodiment, an MPI policy providing both cash flow and collateral risk coverage can be added to an already existing loan that previously had no mortgage insurance of any kind. Such MPI coverage could be conditioned on the existing loan being amended or replaced with an amended or new loan on amended or new terms, including any amended or new loan terms and/or rate.

As is typical with insurance policies, the specific terms and rates of the MPI would be determined on a case-by-case basis and depend on several factors, including the type of loan, the amount of coverage requested as well as the risk exposure attributable to the borrower. In one embodiment of the invention, a borrower that does not qualify for prime rates applies for MPI and requests that the loan be fully insured—i.e., all scheduled loan payments from the first default to foreclosure are guaranteed to be made to the lender on borrower's behalf should borrower fail to make any payments. In another embodiment, the borrower can seek partial insurance, whereby the insurer only pays the missed interest portion of the scheduled payments or just taxes and insurance on the property. In yet another embodiment, the insurer would not begin to make any payments until after any and all servicer payments ceased.

Referring now to FIG. 1, a computer system 100 for processing mortgage loans financed in connection with MPI is shown in accordance with an embodiment. As shown in FIG. 1, a system 100 comprises a lender system 120 and a purchaser system 130. Lender system 120 includes a loan origination system 122, an underwriting engine 124, an LOS user interface 126, a user interface 128 and is coupled to a database 150, third party service provider system 140, and insurance provider system 110. Purchaser system 130 further comprises an underwriting engine 132 and is coupled to a database 160 and a third party service provider system 170. Insurance provider system 110 includes a user interface 108, underwriting engine 104, and commitment engine 106. Herein, although the term "logic" is used in connection with some blocks and the term "processor" is used in connection with other blocks, these two terms are used interchangeably. The term "processor" is used in the generic sense and is not meant to imply a separate discrete unit of processing hardware.

System 100 is configured to allow mortgage loan originators (e.g., lenders or third party originators such as brokers) to obtain underwriting recommendations for loan applications as well as other services associated with underwriting, originating and other processing of mortgage loans (e.g., obtaining a credit report, flood, title, mortgage insurance (MI), mortgage payment insurance (MPI), registering a loan, rate locking a loan, obtaining a price for a loan, etc.). The mortgage loans can be used for purchasing housing or refinancing housing. In one embodiment, loan origination system 122 is associated with and configured to be used by a third party originator such as a broker, lender system 120 is associated with and configured to be used by a mortgage loan lender (e.g. a wholesale mortgage lender) and purchaser system 130 is associated with and configured to be used by a participant in the secondary mortgage market. Herein, for convenience, the participant is referred to as a "purchaser," although it should be understood that the purchaser may participate in the secondary market in other, different, or additional ways (e.g., as a loan guarantor, as a loan securitizer, and so on).

Engines and systems of the system 100 may utilize existing computer capabilities, both hardware and software, and electronic communication links, for example, to receive and process in real time data provided by a broker, a lender, etc. Loan origination system 122, lender system 120, insurance provider system 110, and purchaser system 130 and engines and subsystems thereof may be implemented on computer systems and may include computer servers. The systems 110, 120, and 130 may be implemented on a separate logical server or using a separate physical device. Computer systems or servers may operate under the control of computer software to carry out the process steps described herein. Computer software for each system or engine may include a set of software objects and/or program elements collectively having the ability to execute independently in a separate thread or logical chain of process evaluation, while permitting the flow of data inputs therebetween. Data may communicated between the various systems in real time over the Internet or other computer network. Various embodiments may be implemented in a variety of environments including a single computer system, intranets, local area networks, communication networks, dial-up services, etc.

It will be appreciated that the system 100 may perform fewer or additional functions as compared to those described herein. For example, an entity that performs only some of the above-mentioned processes may use a computer system that contains only a subset of the functions described herein.

In one embodiment system 100 can be configured to allow mortgage loan originators (e.g., lenders or third party originators such as brokers) to obtain underwriting recommendations and other loan processing services for loan applications. While the final underwriting decision is made by the lender, an automated underwriting engine may be used to provide an indication whether a loan (or loans) meets the eligibility requirements of, for example, a purchaser based on a set of loan information provided by the lender or broker. Referring to FIG. 1, lender system 120 is configured to access an underwriting engine 124. In one embodiment, underwriting engine 124 is implemented as part of purchaser system 130. In another embodiment, underwriting engine 124 is implemented as part of lender system 120. In yet another embodiment both lender system 120 and purchaser system 130 can work in connection with an underwriting system. The purchaser system 130 is preferably useable to support various transactions which may be executed by a purchaser in connection with one or more mortgage loans, such as loan acquisition, servicer and investor reporting, and securitization.

The underwriting engine 124 includes data capture logic and underwriting logic. The data capture logic is used to receive information to be used in loan underwriting (e.g., information from a loan application and a mortgage payment insurance policy). Typically, the information that is received for loan underwriting is a subset of the information that would be provided on a loan application. In an exemplary embodiment of the invention, the data capture logic receives information from a user and/or insurance provider 110 with respect to borrower obtaining MPI. The underwriting logic analyzes the information to determine if the loan meets the eligibility requirements of a purchaser or of a lender for the purposes of its portfolio, and then issues a recommendation based on the assessment of the loan and the mortgage payment insurance policy. The underwriting logic may also be used to generate reports that provide information regarding the underwriting recommendation for a particular loan, information used in determining the recommendation (e.g., property, loan, and borrower information), and information summarizing key statistics from the credit report (e.g., borrower's open accounts, derogatory accounts, and undisclosed accounts).

Returning to FIG. 1, lender system 120 includes a user interface 128 and a loan origination system (LOS) 122 having an LOS user interface 126. A user of lender system 120 may submit a mortgage file (including loan application data and/or MPI policy information) and request, for example, an underwriting recommendation via user interface 128 or LOS user interface 126. Lender system 120 submits the mortgage file and requests to underwriting engine 124 via a data connection, such as an Internet connection or LAN.

Figure 2:
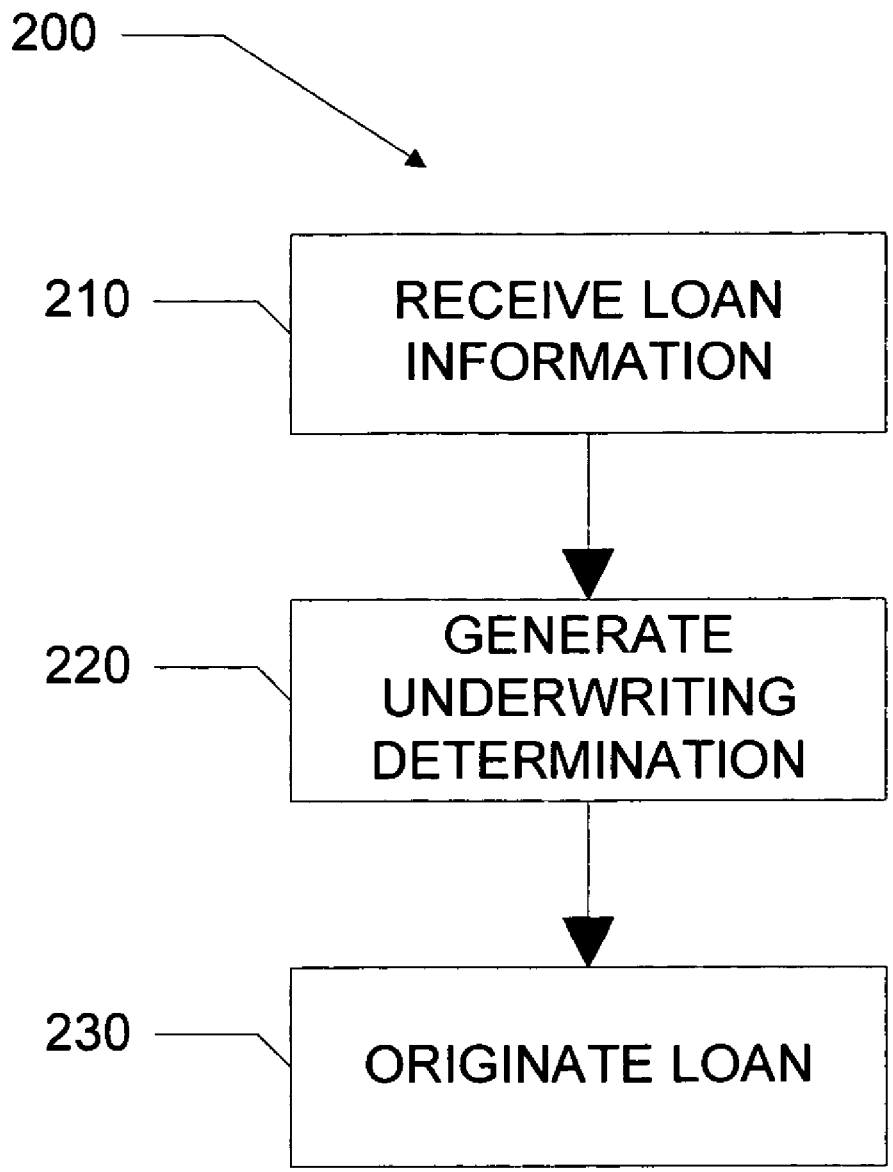
FIGS. 2-4 are flowcharts showing processes that are at least partially implemented using the computer system of FIG. 1 in accordance with an embodiment.

Referring now to FIG. 2, a loan process 200 is shown which is preferably carried out using aspects of the computer system 100. The loan process 200 may be used to originate a mortgage loan with MPI coverage. At step 210, information pertaining to a mortgage loan application is received including information regarding the MPI policy. At step 220, an underwriting determination is generated for the mortgage loan based on the borrower having the MPI policy and, at step 230, a mortgage loan is originated.

The loan process 200 may be performed for example by the lender system 120, or via a third party mortgage originator system (broker). The lender system 120 may receive (step 210) the loan information via the user interface 128 (e.g., if the borrower is shopping online for a mortgage or if the borrower is providing the information to an employee of the lender during an in-person meeting or over the telephone). At least part of the loan information could also be received from an insurance provider system 110. The insurance provider system 110 could identify the MPI policy or provide the terms of the MPI policy including, for example, acceptable loan rates and terms to be charged to the borrower.

Figure 3:
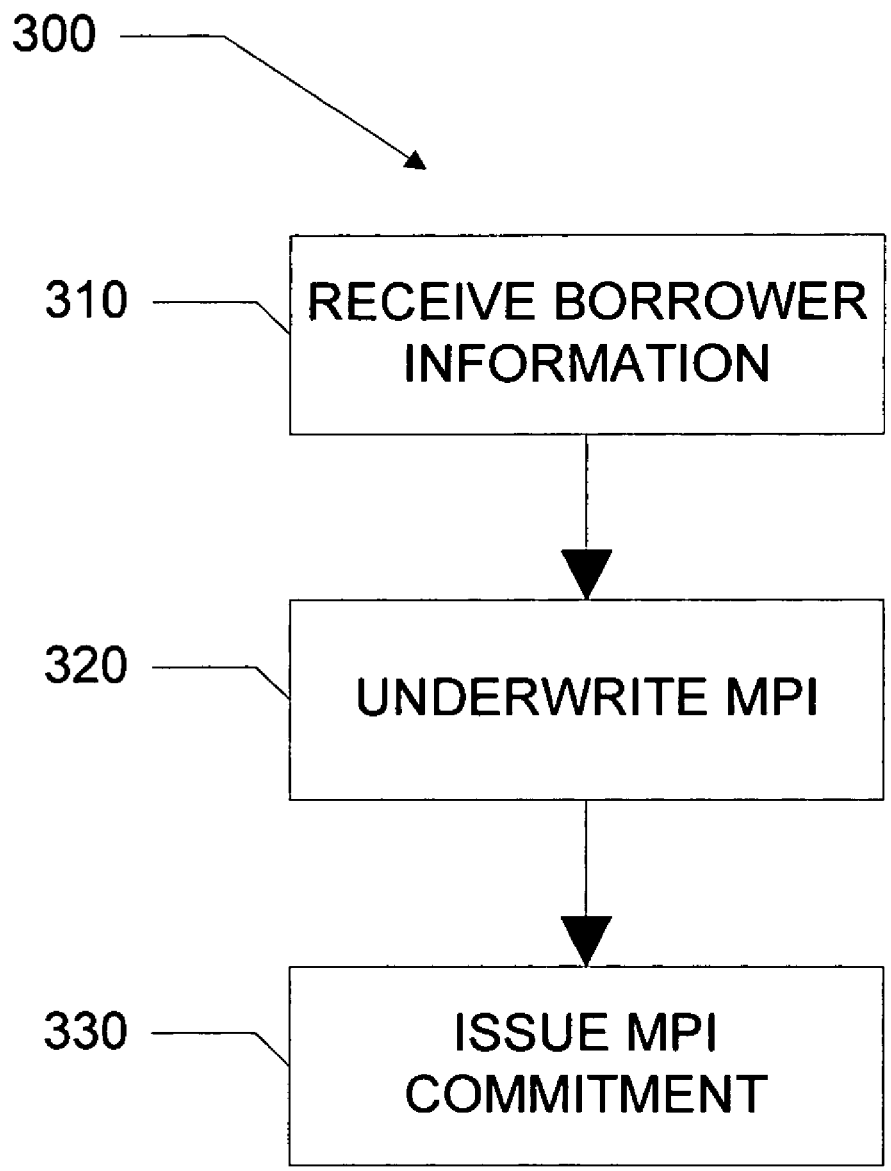

Referring now to FIG. 3, an insurance process 300 is shown which is preferably carried out using aspects of the computer system 100. The insurance process 300 may be used to issue an MPI policy. At step 310, borrower information is received. At step 320, an underwriting determination is generated for the MPI policy and, at step 330, a commitment to provide the MPI policy is generated. The commitment would be conditioned on the borrower's loan meeting certain loan conditions. The loan conditions could include loan type, rate, and other terms that would be appropriate for a loan to a borrower that is insured by MPI, as opposed to a loan that the borrower would otherwise receive without MPI.

The insurance process 300 may further include the steps of receiving borrower loan information from another computer (e.g., a lender system 120) and then confirming that the loan terms satisfy the conditions contained in the insurer's commitment. The mortgage insurance policy can be issued.

Figure 4:
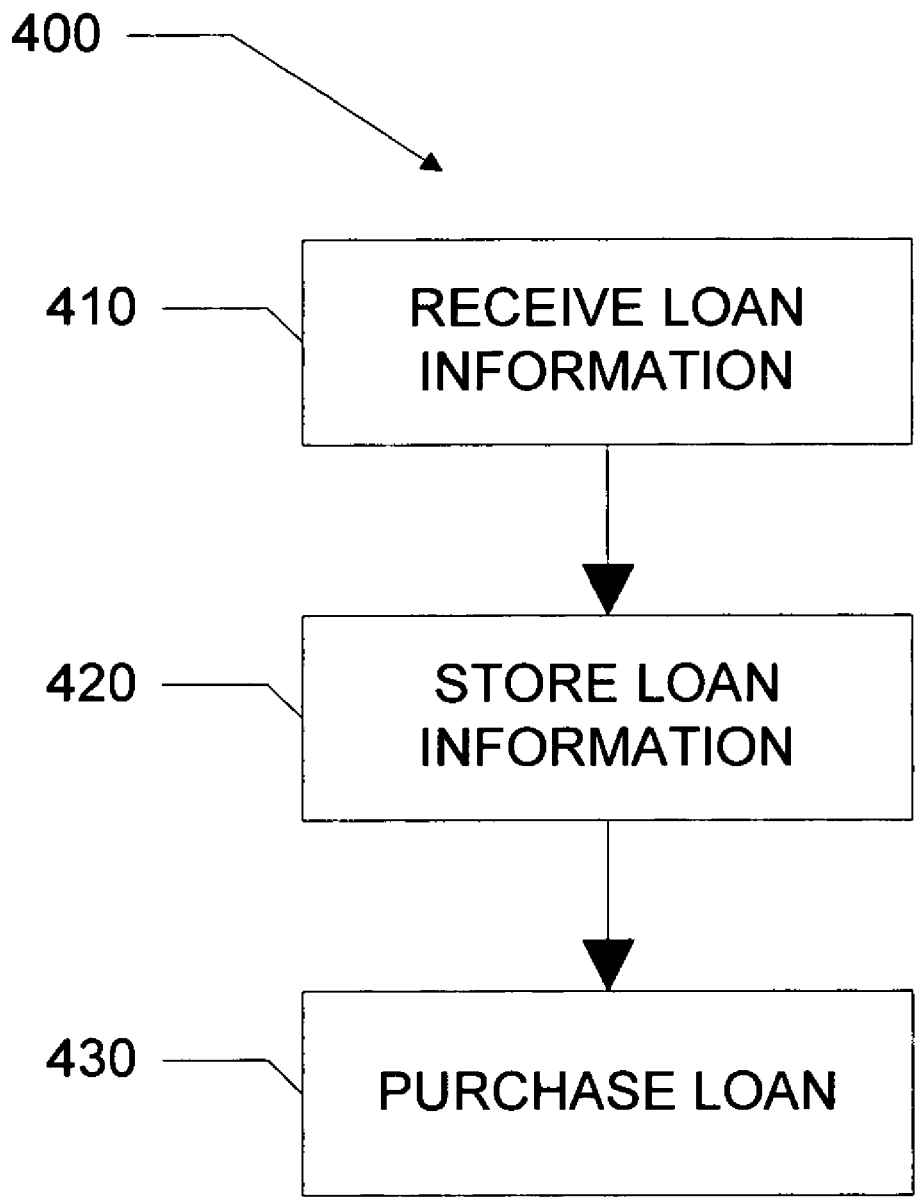

Referring now to FIG. 4, a loan purchasing process 400 is shown which is preferably carried out using aspects of the computer system 100. The loan process 400 may be used to purchase a mortgage loan. At step 410, loan information is received. At step 420, the loan information including an identification of the MPI policy is stored in a database such as database 160. A computer system such as purchaser system 130 may evaluate the loan with an automated underwriting engine such as automated underwriting engine 124 or with a pricing engine. The underwriting engine 124 would determine whether an MPI policy will be provided and factor such insurance coverage into the underwriting determination. At step 430, the purchaser system 130 acquires the loan.

Lender system 120, loan origination system 122, purchaser system 130, and insurance provider system 110 in FIG. 1 may be operated by different entities and may be implemented on separate logical servers or separate physical devices.

In one embodiment, the MPI application data can be delivered to insurance provider 110 via the lender system 120. Other documentation and/or information may be required by the insurance provider system 110. Much of this information may have been gathered by lender system 120 in connection with the loan application process. In another embodiment the borrower can apply directly via insurance provider system 110.

As is common in the industry, the application data can be delivered to the insurance provider system 110 through a variety of means—paper, electronically, etc. The MPI application includes information that would allow insurance provider system 110 to make a decision with respect to providing MPI. The information could include credit information and employment information and/or other information typically provided by a borrower to a lender in connection with obtaining a mortgage loan.

In one embodiment, a borrower submitting loan application information to a lender system 120 via a user interface 128 may indicate that the borrower has or wishes to apply for MPI coverage from an insurance provider system 110. In another embodiment, the borrower seeks MPI from the insurance provider system 110 directly and the insurer provides insurance coverage or indicates an ability to provide insurance coverage to a borrower. The insurer may indicate the terms and conditions of the mortgage loan offered by the lender that are necessary to invoke the insurance coverage. Typically, these terms and conditions would be better terms and conditions that the borrower would be able to obtain without the MPI coverage. In determining the loan terms the lender would be required to provide, the insurance provider system 110 may interface with the lender system 120 and/or the purchaser system 130 or third party service provider system 140 to determine the appropriate market rate terms for a similar borrower.

The insurance provider system 110 could seek information directly from the borrower via user interface 108 or require that the lender system 120 seek additional information from the borrower. The insurance provider system 110 may also seek borrower and loan information from third parties. Borrower information could include credit score or employment information. Loan information could include the market rates for various loans. In addition to facilitating an insurance underwriting decision, the information provided to the insurance provider system 110 can also be used to determine the policy coverage. For example, the market rates would allow the insurance provider system 110 to determine under what loan terms it would provide MPI. For example, the terms of the MPI may provide that the lender will only be paid should the lender provide a loan to the applicant borrower at a specified rate, which would preferably be at or near the market prime rate. In another embodiment, the MPI may provide that the lender will only be paid if the mortgage loan terms meet the MPI providers requirements. For example, MPI will not be provided if the loan has a pre-payment penalty, a teaser rate, a subprime rate, or fees that could be considered exorbitant or predatory. The MPI policy may also require that the lender provide a certification to the insurer confirming that the lender has complied with the MPI policy terms and conditions, the MPI coverage being voided if lender failed to comply.

The insurance provider system 110 underwrites the insurance via underwriting engine 104 and evaluates each MPI application for the probability of mortgage default and ultimately, foreclosure. While each insurance provider system 110 may have its own specific mortgage loan underwriting guidelines, an insurance provider system 110 could use one of the standardized mortgage loan underwriting processes available including Fannie Mae's Desktop Underwriter and Freddie Mac's Loan Prospector accessible via purchaser system 130, for example.

In one embodiment, the insurance provider system 110 can provide a borrower with an insurance commitment via commitment engine 106 which indicates that the borrower will be provided MPI should the borrower be offered a loan on terms that meet the conditions specified by the insurer. A lender system 120 can be configured to accept this commitment and use the terms of the MPI to determine the appropriate loan offerings for the borrower.

In one embodiment, the insurance provider system 110 could refer a borrower to a lender that has been pre-certified by the insurer, wherein the lender has agreed to abide by the insurer's conditions to issuing the mortgage payment insurance policy. In another embodiment, the insurance provider system 110 could access pricing information or other information via lender system 120 that would indicate to the insurance provider system 110 that the borrower will be receiving a mortgage loan with terms that meet the conditions specified by the insurer.

The MPI provided would typically cover scenarios where the borrower fails to make a mortgage payment and thereby defaults on a mortgage loan. No additional conditions of coverage would be necessary. The MPI could include what is typically known as credit disability insurance coverage (pays when a borrower is sick or injured and cannot work), involuntary employment coverage (pays when a borrower loses his/her job involuntarily), and credit property insurance (pays on loss of personal property is used to secure a loan). It also includes all other scenarios where the borrower does not make a loan payment. For example, the borrower could refuse to pay. The borrower could choose to pay off a credit card loan rather than the mortgage loan. The MPI insurance will cover any of the situations where the borrower does not make the payment due the lender. The borrower or lender would not be required to provide the existence of any of these conditions. In an exemplary embodiment, a borrower's default would be the only trigger to the insurer's obligation to pay.

Based on underwriting, the insurance provider system 110 will determine the monthly premiums to be paid by the borrower in exchange for the insurance provider system 110 providing the requested MPI coverage. In another embodiment, a lender or mortgage purchaser could pay the premiums. The cost of the premiums could be billed separately from the loan, included as a separate line item in connection with a single loan payment, or incorporated into the terms of the loan, such as increasing the note rate due to the cost of the MPI.

The insurance provider system 110 can advise the borrower and lender and proceed to issue the insurance if the terms of the insurance were acceptable to each and the loan met the conditions of the insurance commitment. A certificate of insurance could be sent to lender and borrower evidencing the insurance, which would become effective upon the closing of the loan. Of course, in order for the MPI policy to be in effect and remain in effect, the lender/servicer will have to comply with the terms and conditions of the MPI policy. The terms could include an obligation of the lender and/or servicer to foreclose on the property in a reasonable manner or within a certain period of time. In one embodiment, the exposure of the insurance company could be limited to the amount of the scheduled payments due to the lender before the lender can foreclose on the property. In another embodiment, the insurer may continue to pay the insurance payments beyond any agreed time limits but such payments would not be at risk, the insurer being able to recover such payments out of the foreclosure proceeds. MPI may also provide coverage for expenses associated with servicing the delinquent loan, taxes, and hazard insurance.

If during the term of the loan, the borrower failed to make any scheduled payments, the lender would make a claim under the MPI policy. In a preferred embodiment of the present invention, the claim would be made after all applicable notice and cure periods had expired and the servicer no longer had any obligation to make any payments on behalf of borrower. The claim would include supporting documentation regarding the default including copies of the default notices sent to the delinquent borrower. Assuming the claim were valid, the insurer would then issue the amount of the missed payment to lender or servicer (if the servicer paid such amount on behalf of the insurer) and continue to make payments to the lender or servicer (as the case may be) until the property was foreclosed upon, at which time, the insurer would pay any deficiency (up to the agreed-upon coverage amount) between the foreclosure proceeds and the unpaid balance of the loan plus foreclosure expenses. After such payments were made, the insurer's obligation to make payments as well as the MPI policy would terminate.

During the period of delinquency and as a condition to the continued payments being made by the MPI insurer as they come due under the loan, the lender/servicer of the loan would typically provide continued evidence of borrower's default. In addition, the lender/servicer would be required to continue to attempt to collect the delinquent payments (together with all costs and expenses) and proceed to foreclosure should those attempts fail. Currently, lenders/servicers already have guidelines for how to deal with delinquent borrowers. According to one embodiment of the invention, the lender/servicer would be required to continue to maintain those practices as a condition to the continued coverage under MPI.

Should the delinquent borrower, at any time after the lender has received payment from the insurer, be able to bring the loan current or make any payments to lender on account of any payments for which lender or servicer received an insurance claim, said payments (together with all costs and expenses otherwise recoverable under the loan documents) could be forwarded to the insurer. This, of course, would limit the MPI insurer's actual loss to only those loans that are ultimately foreclosed. Since foreclosures occur much less frequently than delinquencies, the actual loss of the MPI insurer could be limited.

As discussed herein, MPI may be used in connection with mortgages due to refinancing as well as purchase money mortgages. In one embodiment directed to refinancing mortgages, the insurer or the lender could pay the equity shortfall in order to facilitate the borrower obtaining a new loan that would include MPI coverage. The insurer or lender may find that they are in a better economic position having paid the equity shortfall than if they had asserted their rights with respect to the original loan.

As with any insurance policy, each insurer will determine its own pricing for such policies. Nevertheless, MPI could result in a significant net positive savings to borrowers as well as limit the losses of mortgage insurers and lenders.

Several other advantages could be possible in providing MPI according to embodiments of the present invention:

1. The cost of lending to non-prime borrowers could be reduced; thus, making home loans more affordable for all borrowers.
2. With lower payments, fewer borrowers are likely to default.
3. Because insurers will have an incentive to reduce claims, insurers will review loan applications to ensure borrowers are getting prime (or near prime) rates—i.e., rates that reflect the fact that a lender has MPI.
4. Predatory loan practices could be reduced because of possible insurance company oversight over loan terms and lender practices.
5. The cost of private mortgage insurance could be reduced since the expected losses will be lower because of lower interest rates.
6. Because of the reduced risk of non-payment as well as proper reserving for losses, secondary markets could be less vulnerable to market shock. This, in turn, will cause there to be greater funds available to be loaned in the secondary marketplace, and further drive down interest rates for home loans.
7. Since payments would be made on borrower's behalf during a time they would otherwise be delinquent, any adverse effect to their credit could be postponed. This would give the borrower greater opportunity to build and preserve their credit.

The invention is described herein with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

The system and process according to the invention can be implemented using a related combination of automated interfaces and manual processes. It should be appreciated, however, that greater use of automated processing and a wider range of product features is also contemplated by the invention.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

It should be noted that although flow charts may be provided herein showing a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and/or in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

It is important to note that the above-described embodiments are illustrative only. Although the invention has been described in conjunction with specific embodiments thereof, those skilled in the art will appreciate that numerous modifications are possible without materially departing from the novel teachings and advantages of the subject matter described herein. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangements of the preferred and other exemplary embodiments without departing from the spirit of the present invention.

What is claimed is:

1. A computer-implemented method of originating a mortgage loan, comprising:
   receiving information from a first computer related to a mortgage loan application from a borrower, wherein the information includes information related to a mortgage payment insurance policy, the mortgage payment insurance policy providing that if the borrower defaults in its payment obligation under the mortgage, the insurer will make one or more insurance payments to borrower's payee, the default requiring no further conditions, the insurer at risk for the insurance payments should a loss result, such insurance payments to be made during the period that the mortgage loan is in default;
   generating an underwriting determination in an automated underwriting engine for the mortgage loan based on the borrower having the mortgage payment insurance policy, the underwriting determination to include an evaluation of any terms or conditions of the loan imposed by the mortgage payment insurance policy; and
   originating a mortgage loan having an interest rate paid by the borrower, the interest rate based on the existence of the mortgage payment insurance policy and subject to any terms or conditions thereof, wherein the above steps are performed by one or more computers other than the first computer programmed to perform the above steps.

2. The method according to claim 1, wherein the information related to a mortgage payment insurance policy includes information identifying a mortgage payment insurance policy including any conditions or terms to the issuance of the mortgage payment insurance policy.

3. The method according to claim 1, wherein the information related to a mortgage payment insurance policy includes information that can be provided to an insurer to apply for a mortgage payment insurance policy.

4. The method according to claim 1, wherein the insurance payments comprise one or more of the following components of a scheduled payment: principal, interest, taxes, and insurance.

5. The method according to claim 1, wherein the insurer will make an insurance payment comprising an amount equal to some or all of the deficiency between the amount owed on the mortgage loan and the amount recovered from the property.

6. The method according to claim 1, wherein the insurance payments are made after any servicer obligation to make payments on behalf of the borrower ceases.

7. The method according to claim 1, wherein the insurance payments are made in addition to any servicer obligation to make any payment on behalf of the borrower.

8. The method according to claim 1, wherein the insurer can recover payments made under the mortgage payment insurance policy after foreclosure from a property sale or other disposition of the property.

9. The method according to claim 1, wherein the insurer is reimbursed if a cure payment is made by the borrower.

10. The method according to claim 1, wherein the mortgage payment policy terminates upon one or more of the following events: foreclosure of the mortgage loan, termination of the mortgage loan, deed in lieu of foreclosure, or any disposition of the property by the borrower.

11. The method according to claim 1, wherein the mortgage loan provides that the premium due an insurer for providing the mortgage payment insurance shall be collected as part of the mortgage payment.

12. A system for providing mortgage loans to a borrower, the system comprising:
   a computer-readable storage medium having instructions stored therein;
   one or more processors executing instructions stored in the computer-readable medium to implement a user interface for receiving borrower information;
   a loan origination system coupled to the user interface;
   an underwriting engine coupled to the loan origination system;
   wherein the borrower information includes information related to a mortgage payment insurance policy, that if the borrower defaults in its payment obligation under the mortgage, the insurer will make one or more insurance payments to borrower's payee, the default requiring no further conditions, the insurer at risk for the insurance payments should a loss result, such insurance payments to be made during the period that the mortgage loan is in default; and
   the underwriting engine providing an underwriting decision based on the borrower having, and subject to the terms and conditions of, the mortgage payment insurance policy.

13. The system according to claim 12, wherein the information related to a mortgage payment insurance policy includes information identifying a mortgage payment insurance policy including any conditions or terms to the issuance of the mortgage payment insurance policy.

14. The system according to claim 12, wherein the information related to a mortgage payment insurance policy includes information that can be provided to an insurer to apply for a mortgage payment insurance policy.

15. The system according to claim 12, wherein the insurance payments comprise one or more of the following components of a scheduled payment: principal, interest, taxes, and insurance.

16. The system according to claim 12, wherein the insurer will make an insurance payment comprising an amount equal to some or all of the deficiency between the amount owed on the mortgage loan and the amount recovered from the property.

17. The system according to claim 12, wherein the insurance payments are made after any servicer obligation to make payments on behalf of the borrower ceases.

18. The system according to claim 12, wherein the insurance payments are made in addition to any servicer obligation to make any payment on behalf of the borrower.

19. The system according to claim 12, wherein the insurer can recover payments made under the mortgage payment insurance policy after foreclosure from a property sale or other disposition of the property.

20. The system according to claim 12, wherein the insurer is reimbursed if a cure payment is made by the borrower.

21. The system according to claim 12, wherein the mortgage payment policy terminates upon one or more of the following events: foreclosure of the mortgage loan, termination of the mortgage loan, deed in lieu of foreclosure, or any disposition of the property by the borrower.

22. The system according to claim 12, wherein the mortgage loan provides that the premium due an insurer for providing the mortgage payment insurance shall be collected as part of the mortgage payment.

23. A computer-implemented method of purchasing a mortgage loan comprising:

receiving information at a first computer system, the information having been transmitted from a second computer system, and the information pertaining to a mortgage being purchased from an entity associated with the second computer system; and storing the information at the first computer system pertaining to the mortgage loan being purchased, the information including information indicating that the mortgage loan is connected with a mortgage payment insurance policy, and any terms and/or conditions regarding the loan contained therein, the mortgage payment insurance policy providing that that if a borrower defaults in its payment obligation under the mortgage, the insurer will make one or more insurance payments to borrower's payee, the default requiring no further conditions, the insurer at risk for the insurance payments should a loss result, such insurance payments to be made during the period that the mortgage loan is in default; and purchasing the mortgage loan, the mortgage loan having an interest rate paid by a borrower, the interest rate based on the mortgage payment insurance policy, wherein the above steps are performed by one or more computers other than the second computer programmed to perform the above steps.

* * * * *